Sept. 2, 1930.   O. MUELLER ET AL   1,774,941
SPRING WHEEL FOR VEHICLES
Filed Aug. 2, 1929   3 Sheets-Sheet 1

Inventors
OSCAR MUELLER.
MAX NEWMAN.
By Clarence A. O'Brien
Attorney

Sept. 2, 1930.　　O. MUELLER ET AL　　1,774,941
SPRING WHEEL FOR VEHICLES
Filed Aug. 2, 1929　　3 Sheets-Sheet 2

INVENTORS
OSCAR MUELLER.
MAX NEWMAN.
By Clarence A. O'Brien
Attorney

Sept. 2, 1930.   O. MUELLER ET AL   1,774,941
SPRING WHEEL FOR VEHICLES
Filed Aug. 2, 1929   3 Sheets-Sheet 3
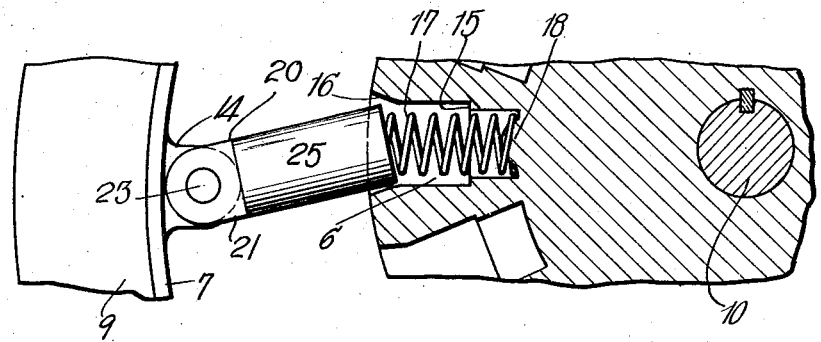
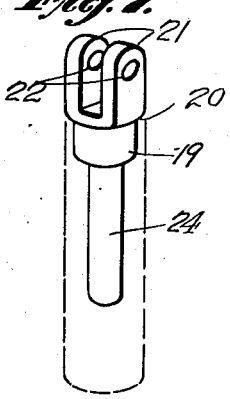
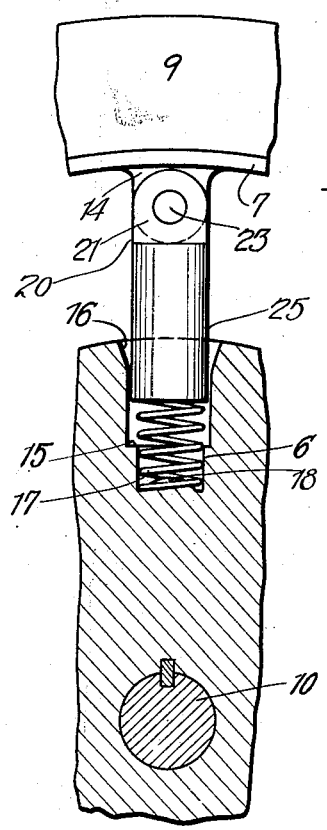
Inventors
OSCAR MUELLER
MAX NEWMAN.
By Clarence A. O'Brien
Attorney Patented Sept. 2, 1930

1,774,941

UNITED STATES PATENT OFFICE

OSCAR MUELLER AND MAX NEWMAN, OF WEST NEW YORK, NEW JERSEY

SPRING WHEEL FOR VEHICLES

Application filed August 2, 1929. Serial No. 383,061.

This invention relates to spring wheels for vehicles, and has as its primary object the provision of an improved and simplified connection between the hub and the outer rim of the wheel, said connection being in the form of radially disposed resilient spokes, and in which the parts of the spokes are so constructed and arranged as to afford the wheel all the resiliency of a pneumatic tired wheel, and which will be at the same time comparatively simple and inexpensive to manufacture, highly efficient in use, durable and practical in service, and otherwise well adapted for the purpose designed.

A still further object of the invention is to provide a spring wheel in which the spring elements thereof are enclosed within a casing and consequently protected from dust, dirt, mud and the destructive influence of the elements.

Other objects and advantages of the invention will become apparent during a study of the following description, taken in connection with the accompanying drawings:

Figure 5 is a fragmentary detail view partly in section and partly in elevation fully illustrating the initial steps in assembling the wheel.

Figure 6 is a view similar to Figure 5 showing the position of the resilient spokes when the assembly has been completed.

Figure 7 is a perspective view of the plunger and the casing surrounding the plunger.

Figure 1:
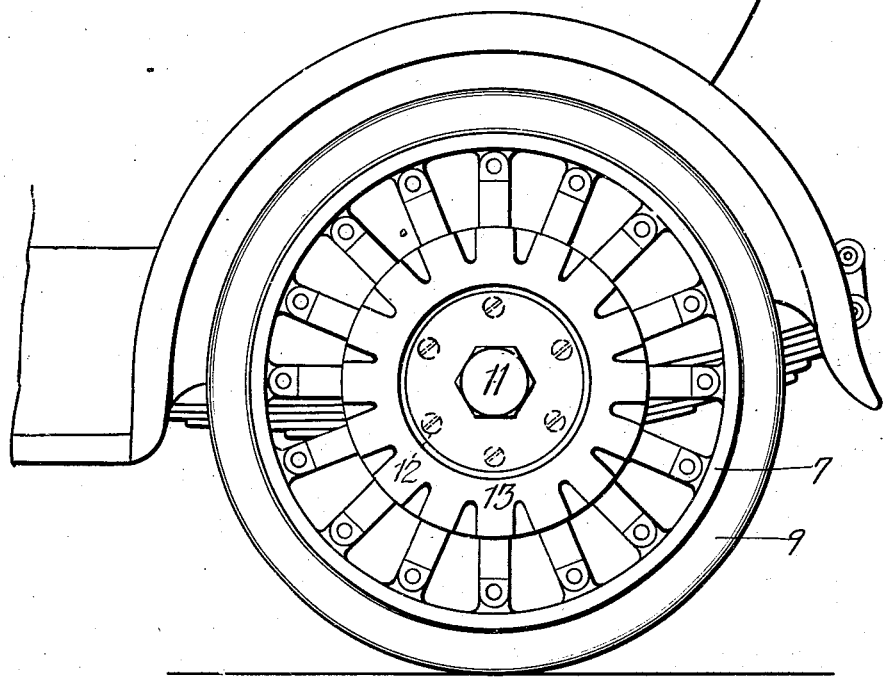
Figure 1 is a side elevation of a spring wheel constructed in accordance with this invention, and showing the application of the same to a motor driven vehicle, the rear end portion of the vehicle being shown fragmentarily.
Figure 2:
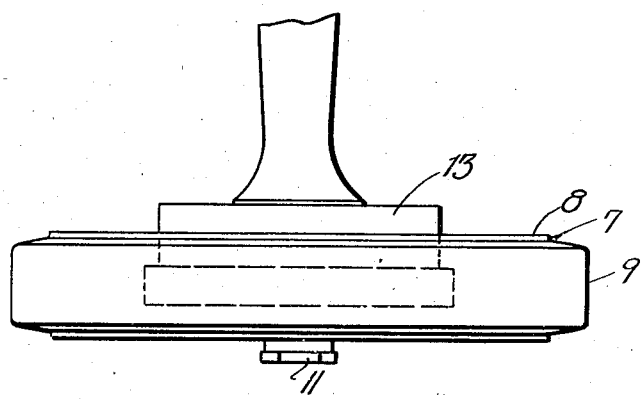
Figure 2 is a top plan view of the wheel.
Figure 3:
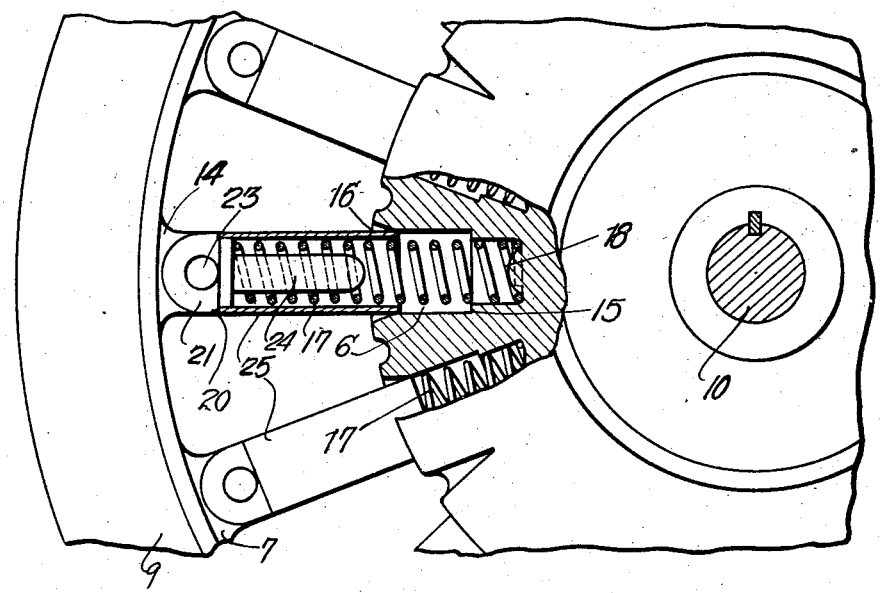
Figure 3 is a detail view shown fragmentarily and partly in section and partly in elevation of the wheel.
Figure 4:
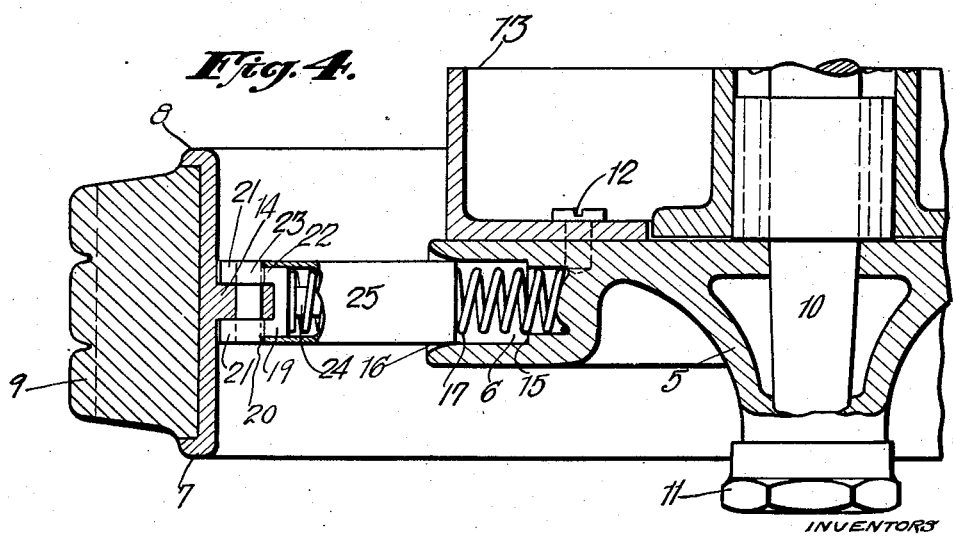
Figure 4 is a fragmentary transverse sectional view through the wheel, certain parts being broken away.

With reference more in detail to the drawings, and wherein like reference characters designate corresponding parts throughout the several views, it will be seen that the hub of the wheel is designated generally by the reference character 5 and that this hub embodies a plurality of radially disposed spaced sockets 6. The sockets 6 open inwardly from the peripheral edge of the hub. The rim of the wheel is designated by the reference character 7, and the rim has its side edges formed with upstanding flanges 8 for retaining in the usual well known manner a cushion tire 9.

The hub 5 is secured to the axle 10 in the usual well known manner, and is further provided with a suitable hub cap 11. Secured to the inner face of the hub 5 through the medium of bolts or other suitable attaching members 12 is the usual brake drum 13.

In the contemplated form of the invention the rim 7 is provided on its inner circumference with a plurality of radially disposed circumferentially spaced inwardly directed lugs 14. The lugs 14 are in number correspondent to the number of sockets 6 in the hub 5, and when the wheel is completely assembled, each lug 14 will be disposed in radial alinement with its respective socket 6. Furthermore, each of the lugs 14 is suitably apertured for a purpose which will be hereinafter more readily presented.

It may be also well to mention here that each of the sockets 6 at its inner end is bored to provide adjacent its inner end an annular shoulder 15. Furthermore each of the sockets 6 has its entrance end somewhat flared as at 16.

Arranged within each of the sockets 6 is a coil spring 17, the inner end of the coil spring being anchored within the bore as at 18. Each disc 19 has formed on one face thereof a substantially U-shaped attaching member 20, which attaching member 20 comprises a pair of upstanding spaced parallel co-extensive legs 21, which legs at their outer edges are apertured as at 22. The apertures 22 are adapted to register with the aperture in the lug 14, said lug 14 being receivable between the legs 21 and a pivot pin 23 is passed through the registering apertures as shown.

Depending from the opposite face of each of the discs 19 is an elongated shank-like plunger 24. The plunger 24 is adapted to extend into the socket 6 and concentrically through the spring 17. The spring 17 at its outer end impinges against the disc 19 for normally urging the plunger 24 outwardly from its socket 6. An elongated open-ended cylindrical tubing or casing 25 has one end thereof adapted to be received in the socket 6 as shown to advantage in Figures 5 and 6, said casing being disposed circumjacent and enclosing the plunger 24 and having its outer end secured in a removable manner about the disc 19.

Obviously the casing 25 will completely enclose the springs 17 and the plunger 24, thus preventing dirt, dust, mud and the like from accumulating between the springs and the plunger, and at the same time protect the spring and plunger from the destructive forces of the elements.

Obviously, in practice, the springs 17 impinging against the disc 19 urge the plungers 24 outwardly of the sockets 6 and maintain the rim 7 a suitable distance from the peripheral edge of the hub. At the same time, any force which may be applied to the tire 9, such as when the vehicle is moving over bumps or the like will of course exert an inward pressure upon the rim 7 forcing the plungers 24 inwardly against the action of the springs 17, and consequently carrying the casings 25 inwardly with this inward movement of the plungers 24, and the inner ends of the casings 25 will abut the shoulders 15 to limit the inward movement of the plunger, it being understood of course that the strikings of the casings 25 at their inner ends against these shoulders will be somewhat gradual due of course to the action of the springs 17, thus eliminating any shock or jarring of the vehicle under such conditions.

Another feature of the invention, is in providing the sockets 6 at their entrance end with the flared openings 16, together with the pivotal connection between the plunger 24 and the rim 7 occasioned through the medium of the lugs and the legs 21 in a manner before described, which will not only permit reciprocatory movement of the plunger 24 but relative movement of the rim with respect to the hub in the manner as suggested in Figure 5.

From the foregoing then it is believed that a clear understanding of the construction, operation and advantages of a spring wheel of this nature will be clear to those skilled in this art, a more lengthy description being deemed unnecessary. It will also be readily appreciated that a spring wheel constructed in accordance with this invention will be strong, durable, thoroughly reliable, practical and efficient in operation and fully capable of affording that desired springiness and flexibility, obviating the need of pneumatic tires for obtaining easy riding of the vehicle as is generally occasioned by pneumatic tires.

Thus the invention while affording the wheel all the resiliency of a pneumatic tired wheel, will obviate the deficiencies, such as the necessity of inflating the tires, the possibility of a puncture, and obviously reduce the upkeep of the machine and at the same time detracting in no way from the appearance of the vehicle.

Various changes in the construction and arrangement of the several parts herein shown and described, may be employed without departing from the spirit of our invention as disclosed in the appended claims.

Having thus described the invention, what we wish to claim is:

1. A spring wheel of the character described, comprising a hub provided with a plurality of circumferentially spaced radially disposed sockets formed therein, each of said sockets having a counter bored portion providing an intermediate disposed shoulder and having its open end portion outwardly flared, a rim circumjacent the hub, circumferentially spaced radial lugs carried by said rim, a disc pivotally secured to each of said lugs, a plunger carried by each of said discs and adapted for movement into and out of an adjacent socket, a coil spring seated against the bottom of and encircling the respective plunger and having its outer end impinging against the adjacent disc for normally urging the plunger outwardly of the socket, a casing mounted on each disc and surrounding the plunger and the spring and having one end thereof slidably receivable in the socket and engageable with the shoulder, said casing adapted for lateral swinging movement when in its extended position with respect to the socket.

2. A spring wheel of the character described comprising a hub provided with a plurality of circumferentially spaced radially disposed sockets formed therein, each of said sockets having an intermediately disposed shoulder provided therein, a rim circumjacent the hub, circumferentially spaced radial lugs carried by said rim, a headed plunger pivotally secured to each of said lugs and adapted for movement into and out of an adjacent socket, a coil spring seated against the bottom of and encircling the respective plunger, and having its outer end impinging against the head of said plunger for normally urging the same outwardly of the socket, a casing carried by each headed plunger and surrounding the same and the spring and having one end thereof slidably receivable in the socket and engageable with the shoulder.

In testimony whereof we affix our signatures.

OSCAR MUELLER.
MAX NEWMAN.